United States Patent
Lemaire et al.

(10) Patent No.: US 10,207,824 B2
(45) Date of Patent: Feb. 19, 2019

(54) RADIATOR DEPLOYABLE FOR A SATELLITE STABILIZED ON THREE AXES

(71) Applicants: AIRBUS DEFENCE AND SPACE SAS, Toulouse (FR); THALES, Neuilly sur Seine (FR); CENTRE NATIONAL D'ETUDES SPATIALES CNES, Paris (FR)

(72) Inventors: Jérôme Lemaire, Trebons sur la Grasse (FR); Yann Miegeville, Mandelieu la Napoule (FR)

(73) Assignees: AIRBUS DEFENCE AND SPACE SAS, Toulouse (FR); THALES, Neuilly sur Seine (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 243 days.

(21) Appl. No.: 15/103,834

(22) PCT Filed: Dec. 15, 2014

(86) PCT No.: PCT/EP2014/077746
§ 371 (c)(1),
(2) Date: Jun. 10, 2016

(87) PCT Pub. No.: WO2015/086851
PCT Pub. Date: Jun. 18, 2015

(65) Prior Publication Data
US 2016/0311561 A1    Oct. 27, 2016

(30) Foreign Application Priority Data
Dec. 13, 2013  (FR) ..................................... 13 62606

(51) Int. Cl.
*B64G 1/44*    (2006.01)
*B64G 1/22*    (2006.01)
(Continued)

(52) U.S. Cl.
CPC ............. *B64G 1/446* (2013.01); *B64G 1/222* (2013.01); *B64G 1/44* (2013.01); *B64G 1/443* (2013.01);
(Continued)

(58) Field of Classification Search
CPC .......... B64G 1/446; B64G 1/66; B64G 1/503; B64G 1/506; B64G 1/443; B64G 1/222;
(Continued)

(56) References Cited

U.S. PATENT DOCUMENTS

| | | |
|---|---|---|
| 4,947,825 A | 8/1990 | Moriarty |
| 5,386,953 A | 2/1995 | Stuart |
| 5,806,800 A * | 9/1998 | Caplin ................... B64G 1/503 165/41 |
| 6,075,200 A | 6/2000 | O'Neill |
| 6,102,339 A * | 8/2000 | Wu ........................ B64G 1/503 244/171.8 |

(Continued)

FOREIGN PATENT DOCUMENTS

EP    0 945 343 A1    9/1999

*Primary Examiner* — Assres H Woldemaryam
(74) *Attorney, Agent, or Firm* — Im IP Law; C. Andrew Im; Chai Im

(57) ABSTRACT

A photovoltaic generator deployable for a satellite stabilized on three axes. The photovoltaic generator includes an assembly of planar panels articulated with respect to each other, and an attachment arm to the structure of the body of the satellite. In a first or launch position of the photovoltaic generator, the planar panels are folded one over the other. In a second or deployed position of the photovoltaic generator, the planar panels are fully deployed with at least a part of the planar panels being photovoltaic panels. At least one planar panel consists of a thermal radiator, with the radiative face thereof being orientated to be opposite the face of the photovoltaic panels carrying the photovoltaic sensors when the photovoltaic generator is in the deployed position. This (Continued)

radiative face is termed the "shade" face, and the face opposite the panel shaped radiator is termed the "sun" face.

13 Claims, 2 Drawing Sheets

(51) Int. Cl.
    *B64G 1/50*     (2006.01)
    *B64G 1/66*     (2006.01)
    *F28D 15/00*     (2006.01)
    *F28D 15/02*     (2006.01)
    *F28F 1/00*     (2006.01)
    *F28D 21/00*     (2006.01)

(52) U.S. Cl.
    CPC ............. *B64G 1/503* (2013.01); *B64G 1/506* (2013.01); *B64G 1/66* (2013.01); *F28D 15/00* (2013.01); *F28D 15/02* (2013.01); *F28F 1/00* (2013.01); *F28D 2021/0021* (2013.01)

(58) Field of Classification Search
    CPC ... B64G 1/44; F28F 1/00; F28D 15/00; F28D 15/02; F28D 2021/0021
    See application file for complete search history.

(56) References Cited

U.S. PATENT DOCUMENTS

| | | | |
|---|---|---|---|
| 6,284,966 B1 | 9/2001 | Simburger et al. | |
| 6,378,809 B1* | 4/2002 | Pon | B64G 1/503 244/171.8 |
| 6,669,147 B2* | 12/2003 | Bertheux | B64G 1/503 244/172.6 |
| 6,854,510 B2* | 2/2005 | Low | B64G 1/222 165/104.14 |
| 2008/0164012 A1* | 7/2008 | Cavanaugh | F03G 6/003 165/104.34 |
| 2010/0243817 A1* | 9/2010 | McKinnon | B64G 1/50 244/171.8 |

* cited by examiner

RADIATOR DEPLOYABLE FOR A SATELLITE STABILIZED ON THREE AXES

RELATED APPLICATIONS

This application is a § 371 application from PCT/EP2014/077746 filed Dec. 15, 2014, which claims priority from French Patent Application No. 13 62606 filed Dec. 13, 2013, each of which is incorporated herein by reference in its entirety.

The present invention relates to the field of three-axis stabilized satellite architectures and especially to the architectures of telecommunications satellites intended to be placed in geostationary orbit.

PREAMBLE AND PRIOR ART

To deal with the ever-increasing volume of telecommunications in the world, telecommunications satellites are increasingly powerful. Their electronic payload (especially traveling wave tubes) thus generates an increasingly high thermal power, about 60% of the electrical power of the satellite, i.e. commonly about several kW, and cooling of this payload is becoming increasingly difficult to achieve.

Conventionally, this cooling is carried out using what are called the north and south sides of the satellite, i.e. the sides substantially perpendicular to the terrestrial equator when the satellite has acquired its station, as radiators, by placing thereon fluid loops or heat pipes that remove the heat generated by dissipating pieces of equipment of the satellite.

The dimensions of these sides then become a limit on the cooling capacity of the satellite.

Various techniques have been envisioned to solve this power/cooling problem for high-powered satellites, but their weight or their complexity are factors limiting their effective use in satellites.

The aim of the present invention is therefore to remedy all or some of these drawbacks.

SUMMARY OF THE INVENTION

For this purpose, according to a first aspect, the invention relates to a deployable photovoltaic generator for a three-axis stabilized satellite, said photovoltaic generator including an array of panels that are hinged to each other, and a yoke for attaching to the structure of a body of the satellite, allowing the photovoltaic generator to freely rotate with respect to the body of the satellite to track the course of the sun during the orbit of the satellite, said photovoltaic generator being able to adopt a first position, called the launch position, in which the panels are folded on top of one another, and a second position, called completely deployed position, in which the panels are completely deployed, at least some of the panels being photovoltaic panels having a photovoltaic-collector side intended to be oriented toward solar radiation, the photovoltaic generator being such that at least one panel consists of a thermal radiator, its radiative side being oriented oppositely to the side of the photovoltaic panels bearing the photovoltaic collectors when the photovoltaic generator is in the deployed position, this radiative side being what is called the "shady" side, and the opposite side of the panel forming the radiator being what is called the "sunny" side.

In this way, the radiator remains oriented toward the shade as long as the photovoltaic collectors are exposed to the sun, i.e. almost all of the time. The radiator is then wholly effective.

In addition, this radiator is deployed with the other panels of the deployable generator, this simplifying implementation. Lastly, the devices for fastening the radiator to the structure of the satellite during the launch phase are then the same as those of the deployable generator, this resulting in a saving of resources.

Therefore a radiator of maximized rejection capacity is obtained while decreasing as much as possible the impact of its implementation on the architecture of the satellite.

Specifically, deployable radiators implemented in satellites are already known, these devices allowing the radiative area of the north and south sides to be increased. It is most often a question of panels hinged about an axle for attaching to the body of the satellite, or about a deployment yoke.

Such deployable radiators constitute an additional mechanical complexity to take into account in the design of the satellite; specifically, they require a dedicated deployment structure, and a specific fastening system, thereby increasing the overall complexity of the satellite.

Moreover, the existing deployable radiators of other satellites are of fixed orientation and are therefore exposed to solar flux at regular intervals, thereby adversely affecting their efficacy. These solutions furthermore require the required space to be made available in the immediate environment of the satellite, generally between the solar generator and the body of the satellite. This raises problems both as regards storage of the photovoltaic panels and of the actual deployable radiator before launch and, once in orbit, as regards management of the volume occupied by the deployable radiators in a space also used by the solar generators or the antennae or the propulsion system.

It will be noted that the panels optionally also have a position that is what is called a semi-deployed position, in which the one or more end panels of the generator are deployed.

According to one particular embodiment, the panel closest the supporting yoke is a panel forming a thermal radiator, each panel being monofunctional, i.e. the thermal-radiator and solar-generator functions are exclusive from each other in each panel of the generator.

This arrangement allows the length of the tubes for flowing cooling fluid between the satellite and the radiator to be decreased. It moreover allows the photovoltaic collectors to be moved away from the nozzles of the attitude-control thrusters of the satellite, thereby decreasing the degradation of the collectors by the jets of said thrusters. The role of this thermal radiator is to provide an additional radiative area in addition to the north-south walls. This thermal radiator is as close as possible to the supporting yoke in order to allow for a short and simple fluidic connection with the north-south walls.

According to one particular architecture, the deployable generator includes a matrix-array of rectangular solar panels arranged in rows and, aligned with the central column of photovoltaic panels, a panel forming a radiator. This implementation allows a simple deployment of the deployable generator. This matrix array may consist of a single row, for example consisting of 4 to 5 panels, or of a plurality of rows, for example 3 rows, each row for example consisting of 3 to 4 panels.

According to one particular embodiment, the generator includes an insulating zone between the radiator panel and the solar panels, so as to decrease the transfer of heat from the radiator panel to the solar panels.

According to one particular embodiment ensuring a good radiator efficacy, at least one panel forming a radiator is traversed by tubes of a fluid loop or a heat pipe, its shady side being covered with a radiative device and its sunny side being covered with an insulating multilayer.

According to a second aspect, the invention relates to a three-axis stabilized satellite, said satellite including at least one deployable array of photovoltaic panels such as described, said photovoltaic panels being stowed in the folded position during launch, then deployed once the satellite has acquired its station, the radiator panel being arranged as close as possible to the body of the satellite.

In one particular embodiment, the satellite includes a fluidic link between the radiator panel of the photovoltaic generator and the body of the satellite.

In one more particular embodiment, the satellite includes a rotary joint arranged between the body of the satellite and the array of panels and in the yoke for supporting the deployable photovoltaic generator, said rotary joint having its axis of rotation coincident with the axis of rotation of the yoke, and including means for passing at least one fluid and means for transferring electric current. This arrangement allows the passage of cooling fluids between the satellite and the radiator, and the transfer of electrical power, while ensuring a free rotation of the yoke for bearing the photovoltaic generator, so as to allow the position of the sun during the orbit of the satellite to be tracked.

In a first embodiment, the rotary joint includes two concentric devices. In this case, which is suitable for the case of cooling by fluid loop, the fluids flow through a central portion of the rotary joint. A device allowing the deployable generator to make a continuous rotary movement as it tracks the sun is thus obtained.

In one particular embodiment that is simple to implement, the means for passing electric current consist of a disk-shaped conductive track swept by a brush that is also conductive.

Alternatively, the heat transfer fluid is passed through a coil of flexible piping suitable for transporting fluid between the body of the satellite and the radiator panel, this coil of flexible piping being securely fastened, at one of its ends, to a circuit for removing heat from the body of the satellite, and, at its other end, to the radiator panel. The coil of flexible piping for example includes two tubes for passing fluid, if the satellite is equipped with a fluid-loop cooler.

This implementation is simpler to produce than a rotary joint suitable for passing fluids. Here, the coil of flexible piping, which for example is of helicoidal shape, allows the flow of cooling fluids to be maintained during the rotary movement of the deployable generator, as far as a predetermined angular value, for example +180 or +360°. Next, the deployable generator makes a rotary movement in the opposite direction, as far as −180° or −360°, in order to return the coil of flexible piping to the inverse position.

In this case, to simplify the drive mechanism of the solar generator, in one particular embodiment (using a flexible piping and not a rotary joint to transport the fluid) current is passed via at least one flexible strand and not by tracks on a rotating disk.

According to another aspect, the invention relates to a method for controlling a photovoltaic generator of a satellite such as described, the method including a step in which, during the rotation of the photovoltaic generator about its axis relatively to the body of the satellite, the coil of flexible piping is gradually deployed but allows the transport of fluids between the body of the satellite and the photovoltaic generator to be maintained, and a step in which, at regular intervals, for example every 24 hours at a time at which it is nighttime in the region of the earth that the satellite is facing, the photovoltaic generator rapidly rotates in the opposite direction to its solar-tracking direction, so as to return the coil of flexible piping to a neutral position, or to a position of maximum deployment in the other direction.

BRIEF DESCRIPTION OF THE FIGURES

The features and advantages of the invention will be better appreciated by virtue of the following description, which description describes the features of the invention by way of one nonlimiting exemplary application.

The description makes reference to the appended figures, which show.

DETAILED DESCRIPTION OF ONE EMBODIMENT OF THE INVENTION

Figure 1:
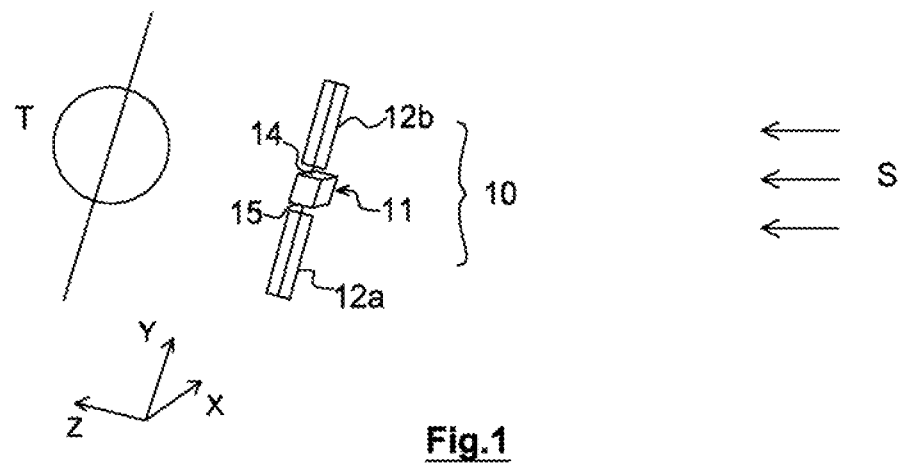
FIG. 1: a schematic representation of a three-axis stabilized satellite in orbit around the earth.

The present invention is intended to be used in a satellite of the type intended to acquire its station in and be stabilized on 3 axes. As may be seen in FIGS. 1 and 2, in one purely illustrative and completely nonlimiting example, it is here assumed that it is a question of a satellite 10 including a body 11 of substantially parallelepipedal shape, the centers of the sides of which define axes X, Y, Z. Such a three-axis stabilized satellite may typically be a telecommunications satellite placed in geostationary orbit.

However, the invention is not limited to geostationary orbits. It is applicable to any orbit and any satellite with a solar generator oriented toward the sun. This is in particular the case when the orientation of the solar generator (SG by abbreviation) toward the sun is ensured by a yaw steering law, optionally combined with a rotation of the SG by a mechanism.

When the satellite 10 has acquired its station in its orbit, its sides are orientated such that a Y axis, called the north-south axis, is parallel to the axis of rotation of the earth, an X axis, called the east-west axis, is parallel to the axis of movement of the satellite in its orbit, and a Z axis, called the down-up axis, is perpendicular to the two others.

A telecoms satellite 10 in geostationary orbit always has the same side toward the earth during its orbit, and its north and south sides 14, 15, which are substantially parallel to the terrestrial equator when the satellite 10 has acquired its station, are the sides the least illuminated by the sun S during the orbit of the satellite around the earth. In the present example, the satellite 10 in question includes two photovoltaic generators 12a, 12b attached to these north and south sides 14, 15. Each photovoltaic generator 12a, 12b is attached to the body 11 of the satellite 10 by a yoke 18a, 18b. Thus, these photovoltaic generators 12a, 12b permanently remain out of the shade generated by the satellite 10 itself. A mechanism allows both the photovoltaic generator to be oriented toward the sun and current to pass from the photovoltaic generator to the satellite 10.

The north and south sides 14, 15 also usually include zones forming radiators (perpendicular to the north-south axis and not illustrated in the figure), thus taking advantage of their low exposure to the sun.

The satellite 10 moreover includes an array of emitting antennas 13 (see FIG. 2) mainly attached to the east and west sides 16, 17 and thus always facing the earth during the orbit of the satellite 10.

This general architecture of the satellite 10 is well known to those skilled in the art, and departs as such from the scope of the invention. It is therefore not described further here.

Although the satellite always keeps the same side oriented toward the earth, the photovoltaic generators 12*a*, 12*b* remain, as much as possible, always oriented toward the sun S. The photovoltaic generators 12*a*, 12*b* therefore make one rotation about the north-south axis with respect to the satellite every 24 hours to track the sun.

These photovoltaic generators 12*a*, 12*b* comprise, in the present exemplary implementation, deployable arrays formed from a hinged array of substantially planar and stackable solar panels 20. This configuration is especially illustrated in FIG. 2. These solar panels 20 are here rectangular panels, the unitary area of which is generally similar to or smaller than the area of a north or south lateral side 14 or 15 of the satellite 10. During the launch, the solar panels 20 forming the photovoltaic generators 12*a*, 12*b* are folded on top of one another, so as to form a compact array attached to a wall of the body of the satellite 10 (see FIG. 3). After the satellite 10 has acquired its station in geostationary orbit, the solar panels 20 are deployed, in a motion known per se, to expose a maximum area thereof to solar radiation. The mechanism and mode of deployment of the solar panels, between their folded configuration and their deployed configuration, are assumed known per se.

The solar panels 20, once deployed, form, in orbit, a substantially planar rectangular paving structure for example including three columns (along the north-south Y axis) and five rows (along the east-west X axis). The array of solar panels 20 could naturally, as a variant, include any number of columns and rows, depending on requirements related to the mission of the satellite 10.

Each solar panel 20 includes a side covered with photovoltaic cells, this side being intended to be turned toward the solar radiation.

Figure 2:
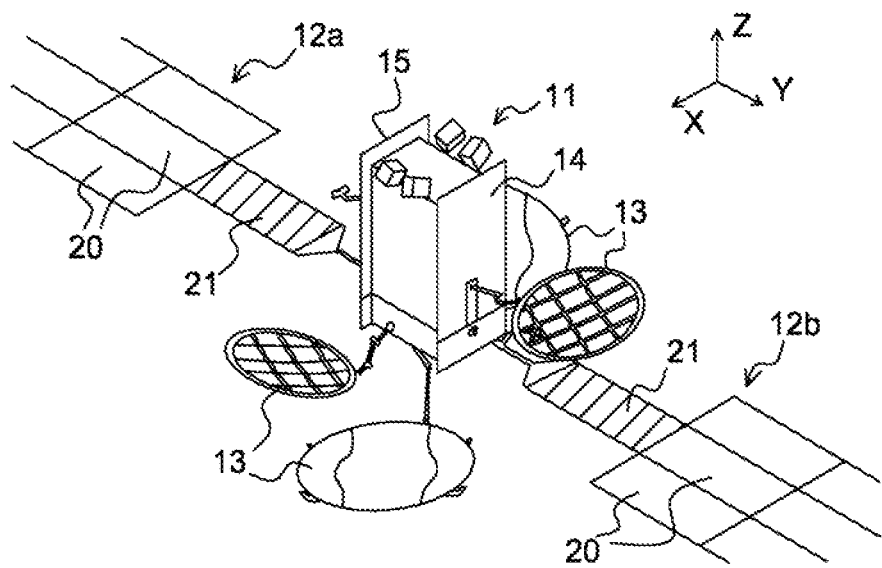
FIG. 2: a schematic perspective representation of a three-axis stabilized satellite including a deployable generator such as described, in the deployed configuration.

In the embodiment given here by way of nonlimiting example and especially illustrated in FIG. 2, each photovoltaic generator 12*a*, 12*b* includes, between the actual array of solar panels 20 and the body 11 of the satellite 10, a radiator panel 21. In the present exemplary embodiment, the radiator panel 21 is connected by a single one of its edges to the matrix array of solar panels 20. More precisely, in the configuration illustrated in FIG. 2, the radiator panel 21 is connected to an array of three columns of five rows of solar panels 20 by its edge furthest from the body 11 of the satellite 10. This radiator panel 21 is aligned with the central column of solar panels 20. It includes deploying means analogous to those of the solar panels, and departing from the scope of the present invention.

The radiator panel 21 is attached to the body 11 of the satellite by way of the yoke 18. The radiator panel 21 also includes means for transmitting the mechanical stresses undergone by the photovoltaic generator 12 to the yoke 18, so that said stresses are taken by the structure of the satellite 10.

In the present embodiment, the radiator panel 21 is connected by its exterior edge to the array of solar panels 20. In fact it is here connected to the interior edge of the solar panel located in the central column and the row closest the body of the satellite.

It may is also, as a variant, be connected to this array of solar panels by another mechanically supporting yoke aligned with the yoke 18 (configuration not illustrated in the figures).

Figure 3:
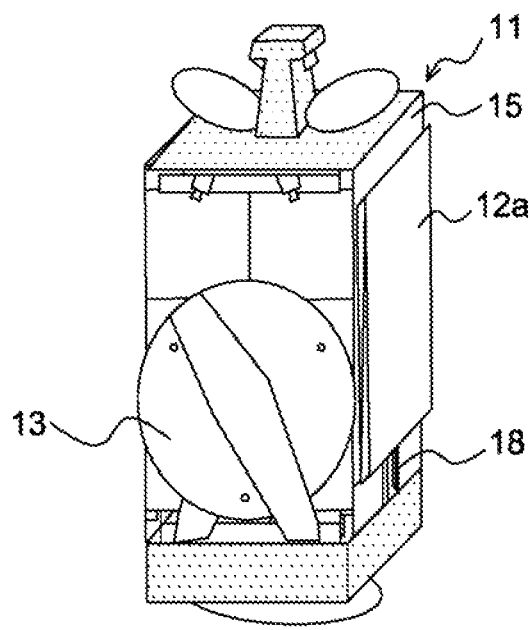
FIG. 3: a schematic representation of a similar satellite, with the deployable generator stowed.

As may be seen in FIG. 3, when the satellite 10 is in the launch position, the panels 20, 21 forming a photovoltaic generator 12*a*, 12*b* are folded on top of one another and are placed in front of one side (for example the north or south side) of the satellite. The radiator panel 21 is then stacked with the other panels. The configuration of the satellite 10 in the launch position is unchanged with respect to a conventional satellite configuration (i.e. one devoid of photovoltaic generators such as described), with however stacks of panels thicker here by the thickness of the radiator panel 21.

In this launch configuration, each yoke 18*a*, 18*b* for supporting a generator 12*a*, 12*b* is retracted into the interior of the body 11 of the satellite 10.

Figure 4:
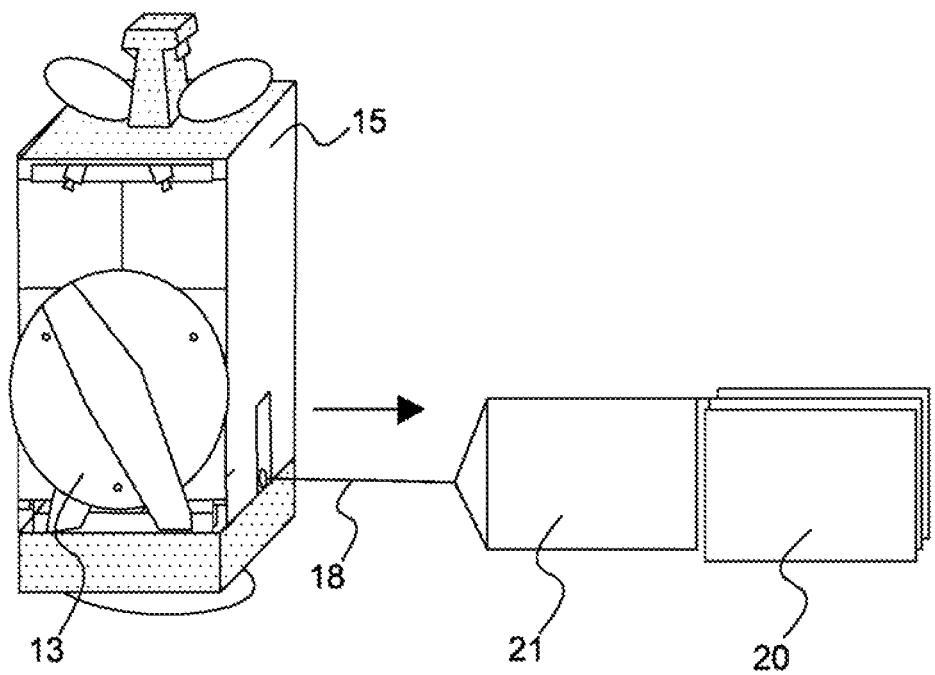
FIG. 4: a representation of the satellite in FIG. 2, the deployable generator being in the process of deployment.

FIG. 4 then illustrates a configuration of a photovoltaic generator in the process of deployment, during the station acquisition of the satellite 10, once the latter has been placed in geostationary orbit. During this deployment, each yoke 18*a*, 18*b* exits from its housing in the body of the satellite. Next, the panels 20, 21 are deployed in a conventional motion to adopt their position of maximum area facing the solar radiation. In the present example, the first panel 21 is the radiator panel, each following row of panels containing three solar panels 20.

In the present completely nonlimiting exemplary embodiment, each radiator panel 21 includes a course of one or more tubes for flowing fluid. It may be a question of heat-pipe and/or fluid-loop tubes. This or these tubes realize the exchange of heat between the fluid flowing in the interior of said tubes and the exterior medium, in a direction not exposed to the solar radiation.

Each radiator panel 21 includes a thermally insulating side that is oriented toward the solar radiation and that is therefore coplanar with the side of the solar panels 20 bearing the photovoltaic cells. This insulating side is for example, but nonlimitingly, covered with a multilayer insulation (MLI) of type known per se. This insulating side may also include a layer of any other very thermally insulating material. The aim of this insulation is to restrict as much as possible the entrance of radiation on the "sunny" side.

The side opposite the thermally insulating side, i.e. the side orientated with its back to the sun, is, in the present exemplary embodiment, covered with a radiative device.

This radiative device here, but nonlimitingly, consists of white paint. It may also be a question of an optical solar reflector (OSR) or any other means known per se to this end.

As was stated above, the photovoltaic generator 12*a*, 12*b* remains almost permanently oriented toward the sun, whereas the body of the satellite remains turned toward the earth. Thus, the photovoltaic generator is in rotation about an axis of rotation embodied by the yoke 18*a*, 18*b* with respect to the body of the satellite 10.

The transport of heat transfer fluid between the body of the satellite 10 and the radiator panel 21 of the photovoltaic generator 12*a*, 12*b* must therefore take into account this rotary movement.

In a first implementation, the photovoltaic generator 12*a*, 12*b* includes a rotary joint placed between the structure of the satellite 10 and the array of panels 20, 21, for example in the supporting yoke of the deployable photovoltaic generator, said rotary joint having its axis of rotation coincident with the axis of rotation of the yoke. This rotary joint includes means for passing at least one fluid and means for transferring electric current.

In one embodiment, the rotary joint includes, in a central portion, one or two concentric devices for passing fluid (depending on whether the device uses a heat pipe or a fluid loop). Such rotary joints for passing a fluid are already known per se and depart, as such, from the scope of the present invention. For examples of such rotary joints used in aerospace, reference may for example be made to the document AIAA Paper 86-1298 Heizer, Goo, Rhodes et al. "A steerable radiator for spacecraft application", 4th joint thermophysics and heat transfer conference.

The means for passing electrical current for example consist of a disk-shaped conductive track swept by a brush that is also conductive. The sweeping of the brush over the track ensures the passage of the current independently of the respective angular position of these means.

In a second implementation, the photovoltaic generator 12a, 12b includes a coil of flexible piping (hubless winding) suitable for passing fluid between the body of the satellite and the radiator panel 21. This coil of flexible piping is securely fastened, at one of its ends, to the circuit for removing heat from the body of the satellite, and, at its other end, to the radiator panel 21. Here again, the coil of flexible piping may include one or two tubes for passing fluid, depending on whether the satellite is equipped with a heat-pipe or fluid-loop cooler.

Such a "pigtail" coil has a short length at rest, as the turns of tube make contact with one another, and an arbitrarily long length, determined by the number of turns and their diameter, in the deployed position. Such devices are already known per se and depart, as such, from the scope of the present invention.

Thus, during the rotation of the photovoltaic generator about its axis relatively to the body of the satellite, the coil of flexible piping is gradually deployed but allows the transport of fluids (and possibly electricity) to be maintained between the body of the satellite in the generator.

At regular intervals, for example every 24 hours at a time at which it is nighttime in the region of the earth that the satellite is facing, the photovoltaic generator rapidly rotates (for example in a few tens of minutes) in the opposite direction to its solar-tracking direction, so as to return the coil of flexible piping to a neutral position, or to a position of maximum deployment in the other direction.

It is thus possible to provide a maximum travel of the generator about its axis of rotation of +/−190°, and to command, every 24 hours, when the generator is less than 10° from the maximum unwinding of the coil of flexible piping, a rapid rotation to the inverse position.

The means for passing electric current for example consist of a disk-shaped conductive track swept by a brush that is also conductive. The sweeping of the brush over the track ensures the passage of current independently of the respective angular position of these means. Alternatively, current may also be passed through flexible strands in the manner of the coil of heat transfer fluid tubing, with the aim of simplifying the need of the rotating mechanism.

In the implementation that was described here, only one or both deployable generators include one radiator panel 21.

As a variant, one of the photovoltaic generators 12a, 12b includes two aligned and connected radiator panels 21 that are arranged in the central column of panels 20 of the photovoltaic generator 12a, 12b. It is clear that, in another variant embodiment, any number of panels forming the deployable generator 12a, 12b may consist of radiator panels 21, depending on the specifications of the mission of the satellite 10, and, in particular, depending on the thermal power that must be dissipated.

Likewise, a single one of the two deployable photovoltaic generators may include one radiator panel 21. In this case, the dimensions of the other photovoltaic generator are modified so as to ensure the torques of the satellite balance.

In another variant, at least one panel 21 forming a radiator is adhesively bonded to the back side (side opposite the photovoltaic collectors) of one of the solar panels 20 of the photovoltaic generator 12a, 12b.

The invention claimed is:

1. A deployable photovoltaic generator for a three-axis stabilized satellite, the photovoltaic generator comprises an array of panels that are hinged to each other, and a supporting yoke to attach the photovoltaic generator to a structure of a body of the satellite, the panels are folded on top of one another in a first or launch position of the photovoltaic generator, the panels are completely deployed in a second or deployed position of the photovoltaic generator; wherein at least some of the panels are solar panels having a photovoltaic-collector side orientable towards solar radiation; wherein at least one panel consists of a thermal radiator to provide a radiator panel; wherein a radiative side of the thermal radiator is oriented oppositely to a side of the photovoltaic panels bearing photovoltaic collectors in the deployed position of the photovoltaic generator, the radiative side is referred to as a shady side, and an opposite side of the panel forming the thermal radiator is referred to as a sunny side; wherein the panel closest the supporting yoke is a panel forming the thermal radiator; and wherein each panel is mono-functional such that thermal-radiator and solar-generator functions are exclusive from each other in each panel of the photovoltaic generator.

2. The photovoltaic generator as claimed in claim 1, further comprising a matrix-array of rectangular solar panels arranged in rows and aligned with a central column of photovoltaic panels.

3. The photovoltaic generator as claimed in claim 1, further comprising an insulating zone between the radiator panel and the solar panels.

4. The photovoltaic generator as claimed in claim 1, wherein at least one panel forming the thermal radiator is traversed by tubes of a fluid loop or a heat pipe, the shady side of said at least one panel is covered with a radiative device and the sunny side of said at least one panel is covered with an insulating multilayer.

5. The three-axis stabilized satellite, wherein the satellite comprises at least one deployable photovoltaic generator as claimed in claim 1, the panels of the photovoltaic generator are stowed in the launch position during launch and the panels of the photovoltaic generator are deployed in the deployed position once the satellite has acquired an orbital station, the radiator panel is arranged close to the body of the satellite.

6. The satellite as claimed in claim 5, further comprising a fluidic link between the radiator panel of the photovoltaic generator and the body of the satellite.

7. The satellite as claimed in claim 6, further comprising: a rotary joint arranged between the body of the satellite and the array of panels and in the supporting yoke to support the deployable photovoltaic generator, the rotary joint having an axis of rotation coincident with an axis of rotation of the supporting yoke; a fluid conduit to transport at least one fluid; and a conductor to transfer an electric current.

8. The satellite as claimed in claim 7, wherein the radiator panel comprises a fluid loop, and in a central portion, the rotary joint comprises two concentric devices to transport said fluid, the two concentric devices are oriented along the axis of rotation of the rotary joint.

9. The satellite as claimed in claim 7, wherein the conductor is a disk-shaped conductive track swept by a brush that is also conductive.

10. The satellite as claimed in claim 6, further comprising a coil of flexible piping configured to transport a fluid between the body of the satellite and the radiator panel, one end of the coil of flexible piping is securely fastened to a circuit to remove heat from the body of the satellite, and other end of the coil of flexible piping is securely fastened to the radiator panel.

11. The satellite as claimed in claim 10, further comprising a conductor to transfer an electric current, the conductor comprising at least one flexible strand.

12. The satellite as claimed in claim 10, wherein the satellite is equipped with a fluid-loop cooler; and wherein the coil of flexible piping comprises two tubes to transport the fluid.

13. A method for controlling a deployable photovoltaic generator of a three-axis stabilized satellite, the photovoltaic generator comprises an array of panels that are hinged to each other, and a supporting yoke to attach the photovoltaic generator to a structure of a body of the satellite, the panels are folded on top of one another in a first or launch position of the photovoltaic generator, the panels are completely deployed in a second or deployed position of the photovoltaic generator; wherein at least some of the panels are solar panels having a photovoltaic-collector side orientable towards solar radiation; wherein at least one panel consists of a thermal radiator to provide a radiator panel; wherein a radiative side of the thermal radiator is oriented oppositely to a side of the photovoltaic panels bearing photovoltaic collectors in the deployed position of the photovoltaic generator, the radiative side is referred to as a shady side, and an opposite side of the panel forming the thermal radiator is referred to as a sunny side; wherein the panel closest the supporting yoke is a panel forming the thermal radiator; and wherein each panel is mono-functional such that thermal-radiator and solar-generator functions are exclusive from each other in each panel of the photovoltaic generator;

the satellite is equipped with a fluid-loop cooler, the satellite comprises a fluidic link between the radiator panel of the photovoltaic generator and the body of the satellite, and a coil of flexible piping comprising two tubes to transport a fluid between the body of the satellite and the radiator panel, one end of the coil of flexible piping is securely fastened to a circuit to remove heat from the body of the satellite, and other end of the coil of flexible piping is securely fastened to the radiator panel;

the method comprises the steps of:

stowing the array of panels of the photovoltaic generator in the launch position during launch, then deploying the panels in the deployed position once the satellite has acquired an orbital station, the radiator panel is arranged close to the body of the satellite;

gradually deploying the flexible piping while maintaining the transport of fluids between the body of the satellite and the photovoltaic generator during a rotation of the photovoltaic generator about an axis relative to the body of the satellite; and at regular intervals, rotating the photovoltaic generator in a direction opposite to a solar-tracking direction, to return the coil of flexible piping to a neutral position, or to a position of maximum deployment in other direction.

\* \* \* \* \*